US008606918B2

United States Patent
Zhu et al.

(10) Patent No.: US 8,606,918 B2
(45) Date of Patent: Dec. 10, 2013

(54) METHOD FOR RESOURCE ALLOCATION, BASE STATION AND MOBILE COMMUNICATION TERMINAL

(75) Inventors: Jianchi Zhu, Beijing (CN); Xiaoming She, Beijing (CN); Lan Chen, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 572 days.

(21) Appl. No.: 12/555,724

(22) Filed: Sep. 8, 2009

(65) Prior Publication Data
US 2010/0138541 A1 Jun. 3, 2010

(30) Foreign Application Priority Data

Sep. 9, 2008 (CN) .......................... 2008 1 0215914

(51) Int. Cl.
| G06F 15/173 | (2006.01) |
| G06F 15/167 | (2006.01) |
| H04W 4/00 | (2009.01) |
| H04B 7/216 | (2006.01) |
| H04J 3/00 | (2006.01) |
| H04L 12/28 | (2006.01) |

(52) U.S. Cl.
USPC ........... 709/226; 709/217; 709/223; 709/224; 709/225; 370/329; 370/335; 370/336; 370/400

(58) Field of Classification Search
USPC .......... 709/217, 223–226; 370/329, 335, 336, 370/400
See application file for complete search history.

(56) References Cited

U.S. PATENT DOCUMENTS

| 2008/0045272 A1* | 2/2008 | Wang et al. .................... 455/561 |
| 2008/0130590 A1* | 6/2008 | Kim et al. ...................... 370/336 |
| 2010/0091728 A1* | 4/2010 | Kim et al. ...................... 370/329 |
| 2010/0118798 A1* | 5/2010 | Chun et al. ..................... 370/329 |
| 2010/0118803 A1* | 5/2010 | Ishii et al. ...................... 370/329 |

(Continued)

FOREIGN PATENT DOCUMENTS

| WO | 2007/148706 A1 | 12/2007 |
| WO | WO 2007/148706 A1 | 12/2007 |
| WO | WO 2008097001 A1 * | 8/2008 |

OTHER PUBLICATIONS

Extended European Search Report for related European Patent Application No. 09011509.8, Oct. 4, 2011, 13 pgs.

(Continued)

*Primary Examiner* — David Lazaro
*Assistant Examiner* — Farzana Huq
(74) *Attorney, Agent, or Firm* — Blakely, Sokoloff, Taylor & Zafman LLP

(57) ABSTRACT

The present invention provides a method for resource allocation, a base station and a mobile communication terminal. The method includes: setting a persistent radio resource set and a complementary resource set pre-allocated to a terminal; determining a radio resource to be used according to the size of a packet to be transmitted by the terminal or the base station. According to one embodiment of the present invention, when a whole packet cannot be transmitted by using the pre-allocated persistent resource, the complementary resource can be allocated to the terminal so that the packet doesn't need to be divided, time delay is reduced, physical layer control information is decreased and the number of accommodated terminal users is increased. The present invention is applicable to any service in which packets arrive periodically, such as VoIP service and real-time service.

23 Claims, 16 Drawing Sheets

(56) References Cited

U.S. PATENT DOCUMENTS

| | | | |
|---|---|---|---|
| 2010/0118804 A1* | 5/2010 | Kim et al. | 370/329 |
| 2010/0248765 A1* | 9/2010 | Chun et al. | 455/509 |
| 2010/0279695 A1* | 11/2010 | Amirijoo et al. | 455/438 |
| 2011/0194502 A1* | 8/2011 | Sung et al. | 370/329 |

OTHER PUBLICATIONS

NEC Group, "DL Multiplexing for Persistent and Dynamic scheduling", R1-074717 3rd Generation Partnership Project, Oct. 30, 2007, 3 pgs., vol. RAN WG1, Juju, South Korea.

ETRI, "Remaining issues on persistent scheduling", R2-073128 3rd Generation Partnership Project, Aug. 14, 2007, 3 pgs., vol. RAN WG2, Athens, Greece.

Samsung, "Blind Decoding for Persistent Scheduling", R2-075006 3rd Generation Partnership Project, Nov. 12, 2007, 4 pgs., vol. RAN WG2, Jeju, Korea.

Partial European Search Report for related European Patent Application No. 09011509.8, Jun. 28, 2011, 7 pgs.

NEC, "Persistent scheduling and dynamic allocation", R2-063406 3rd Generation Partnership Project (3GPP), Mobile Competence Centre, Nov. 1, 2006, 6 pgs., Riga, Latvia.

LG Electronics Inc., "Discussion on Persistent Scheduling", R2-074982 3rd Generation Partnership Project (3GPP), Mobile Competence Centre, Nov. 12, 2007, 3 pgs., Jeju, Korea.

ASUSTEK, "Identification of the demand for more UL resource", R2-080887 3rd Generation Partnership Project (3GPP), Mobile Competence Centre, Feb. 5, 2008, 1 pg., Sorrento, Italy.

European Office Action ref: Patent Application No. 09 011 509.8-2412, dated Nov. 11, 2012.

Japanese Office Action ref: Patent Application No. 2009-208510, dated Apr. 22, 2013 (English Translation attached), 6 pages.

ASUSTeK, "Identification of the demand for more UL resource", 3GPP TSG RAN WG2 #61, Sorrento, Italy, Feb. 11-15, 2008, 2 pages.

\* cited by examiner

METHOD FOR RESOURCE ALLOCATION, BASE STATION AND MOBILE COMMUNICATION TERMINAL

PRIORITY

The present application claims priority to and incorporates by reference the entire contents of Chinese patent application, No. 200810215914.4, filed in China on Sep. 9, 2008.

FIELD OF THE INVENTION

The present invention relates to the wireless communication field, particularly to a kind of resource allocation technique for any service in which packets arrive periodically, such as a VoIP (Voice over Internet Protocol) service and a real-time service, and more particularly to a method for resource allocation, a base station and a mobile communication terminal.

BACKGROUND OF THE INVENTION

FIG. 1 is a schematic diagram showing the architecture of a wireless communication network. As shown in FIG. 1, a typical wireless communication network generally includes one or more terminals, base stations and a core network, wherein different base stations may connect with each other by requirements, and a network composed of the base stations, which is usually named as a RAN (radio access network), is responsible for access layer transactions such as radio resource management. The radio resources including uplink and downlink resources are scheduled by the base stations according to the manner of sharing resources. Base stations are all connected to the core network, and specifically each of the base stations can be connected to one or more core network nodes (CN). The core network is responsible for non-access layer transactions, such as billing and location management. The terminal may be a device communicating with the network, such as a mobile phone or a laptop computer.

In the wireless communication system which adopts packet transmission mode, such as LTE or LTE-A system, uplink and downlink data are generally transmitted with dynamic scheduling.

The following will make descriptions with a VoIP service as an example.

Currently, the VoIP service is a very important service and basic principles of the VoIP service include: at a transmitter, compressing voice data codes using a voice compressing algorithm, packing the compressed voice data according to the TCP/IP protocol, and then transmitting the packed voice data to a receiver through an IP network; and at a receiver, concatenating the packed voice data and de-compressing to restore them into the original voice data, in order to transmit the voice data over the Internet.

Such VoIP service characterizes in constant rate and relatively small size VoIP packet. As shown in FIG. 2, the VoIP service includes two parts: talkspurt and silent period. During the talkspurt, a voice encoder generates a VoIP packet every 20 ms; whereas during the silent period, the voice encoder generates a SID (silence indicator) packet every 160 ms.

Since the size of a VoIP packet is very small and a large amount of signaling is needed to notify the VoIP user when the base station performs resource allocation and scheduling, it will severely limit the number of VoIP users in the system. Therefore, a more effective scheduling scheme is needed for the VoIP service.

In related art, as shown in FIG. 3, since the size of the VoIP packet and arriving intervals of the VoIP packets are well regulated, a persistent scheduling scheme is adopted to pre-allocate a fixed location and fix-sized radio resources for the VoIP service in order to reduce overhead of control signaling, and a modulation coding scheme (MCS) is specified for transmitting the VoIP packets. However, since HARQ and silence suppression techniques are adopted, the original regulation of VoIP data transmission may be influenced, so dynamic scheduling of control signaling is needed as compensation for the persistent scheduling scheme, which is referred to as a semi-persistent scheduling scheme in the LTE or LTE-A system.

The semi-persistent scheduling scheme is a semi-dynamic scheduling algorithm based on the talkspurt, i.e. the VoIP user occupies resources during the talkspurt and releases the occupied resources during the silent period. Characteristics of the semi-persistent scheduling are as follows.

The initial transmission of the VoIP packets conforms to the persistent scheduling scheme; for retransmission of the VoIP packets, the downlink adopts the dynamic resource allocation scheme, while the uplink adopts the dynamic or persistent scheduling scheme; if dynamic signaling for the dynamic resource allocation exists during the initial transmission of the VoIP packets, the dynamic resource allocation scheme is adopted.

Herein, the initial transmission of the VoIP packets conforms to the persistent scheduling scheme, i.e. the resources adopted by the VoIP packets conform to a certain regulation, while this regulation is notified by the base station to the VoIP user when a VoIP connection is established and the base station per-allocates resources for the VoIP packets. In this case, the VoIP user will exactly know his/her own resource units every 20 ms, without the signaling notification. The resources within an interval (19 ms) between two VoIP packets are managed uniformly by the base station and can be allocated to any service or user.

In addition, the VoIP packet which is transported from the application layer is complementary with a RTP/UDP/IP packet header after passing the network layer. The size of the packet header is generally 40/60 bytes. Since the size of the VoIP packet is comparatively small and smaller than the packet header, the VoIP header needs to be compressed. In related art, the RoHC (Robust Header Compression) technique is adopted to compress the header of the VoIP packet in the PDCP (Packet Data Convergence Protocol) layer. According to the RoHC technique, the header with the size of 40/60 bytes can be compressed to 3~15 bytes. Thus, the size of the VoIP packet arriving at the MAC/PHY layer is variable and therefore the resource requirements of different size VoIP packets are different, as shown in Table 1.

TABLE 1

| AMR codec mode | Compressed (bytes) | TDD DL (PRBs) | TDD UL (PRBs) | FDD DL (PRBs) | FDD UL (PRBs) |
|---|---|---|---|---|---|
| AMR 4.75 kbps | 17~29 | 2~3 | 2~3 | 1~2 | 1~2 |
| AMR 5.15 kbps | 18~30 | 2~3 | 2~3 | 1~2 | 1~2 |
| AMR 5.90 kbps | 19~31 | 2~3 | 2~3 | 1~2 | 1~2 |
| AMR 6.70 kbps | 21~33 | 2~3 | 2~3 | 2 | 2 |
| AMR 7.40 kbps | 23~35 | 2~3 | 2~3 | 2 | 2 |
| AMR 7.95 kbps | 25~37 | 2~3 | 2~3 | 2 | 2 |

TABLE 1-continued

| AMR codec mode | Compressed (bytes) | TDD DL (PRBs) | TDD UL (PRBs) | FDD DL (PRBs) | FDD UL (PRBs) |
|---|---|---|---|---|---|
| AMR 10.2 kbps | 30~42 | 3~4 | 3~4 | 2~3 | 2~3 |
| AMR 12.2 kbps | 35~47 | 3~4 | 3~4 | 2~3 | 2~3 |
| AMR SID | 10~22 | 1~2 | 1~2 | 1~2 | 1~2 |

As shown in Table 1, the MCS adopts QPSK2/3, and when the AMR (Adaptive Multi Rate) coding algorithm adopts 12.2 kbps, the size of the compressed VoIP packet is 35~47 bytes. In this case, the TDD DL (downlink) and UL (uplink) occupies 3~4 RBs (resource blocks) in one subframe, and the FDD DL and UL occupies 2~3 RBs in one subframe.

FIG. 4 is a schematic diagram showing the division of a comparatively large VoIP packet into continuous packets. As shown in FIG. 4, when a packet X with normal size is transmitted, pre-allocated resource Y can meet the requirement of the VoIP packet transmission. However, when a larger packet X+1 is transmitted, the pre-allocated resource Y cannot meet the requirement of the larger VoIP packet transmission, and thus only a part of the VoIP packet (the part without a shade) can be transmitted while the other part A (the part with shade) cannot be transmitted. Thus, the part A of the packet needs to occupy part of resources Y1 of packet X+2 and the part B of the packet X+2 needs to occupy part of resources Y2 of packet X+3. Therefore, when a comparatively large VoIP packet is transmitted, this packet will be divided and this kind of dividing will produce a knock-on effect and subsequent VoIP packets will all need to be divided. Therefore, the transmission of the VoIP packet will have delay and a new header is produced.

Currently there are several solutions to solve the problem that occurs when transmitting variable size VoIP packets, and the solutions are described as follows.

Solution one: the pre-allocated resource is set according to the size of the largest VoIP packet; the problems with this solution are that a large amount of resource is wasted and the number of accommodated users is small.

Solution two: the pre-allocated resource is set according to the size of the smallest VoIP packet and when a larger VoIP packet is to be transmitted, the dynamic resource allocation scheme is adopted; the problem with this solution is that more physical layer control signaling (PDCCH) is needed.

Solution three: the pre-allocated resource is set according to the size of the smallest VoIP packet and when a larger VoIP packet is to be transmitted, the comparatively high MCS is adopted; the problem with this solution is that a comparatively large PER (packet error rate) is induced, the retransmission times are increased and the delay is increased.

Solution four: the pre-allocated resource is set according to the size of the largest VoIP packet and when a smaller VoIP packet is to be transmitted, the dynamic resource allocation scheme is adopted and the remaining part of the pre-allocated resource for this VoIP user is allocated to other services or users; the problem with this solution is that the number of accommodated users is comparatively small.

Chinese patent application No. 200710151704.9, with publication No. CN 101127806A, discloses a downlink voice IP service scheduling method, the entirety of which is incorporated herein by reference. According to this method, scheduling overhead can be reduced to some extent, but the problem occurs when transmitting variable size VoIP packets still exists.

US patent publication No. US2008/0062944 A1, entitled "Apparatus and Method for Automatic Repeat Request Signaling with Reduced Retransmission Indications in a Wireless VoIP Communication System", is incorporated herein by reference in its entirety.

US patent publication No. US2008/0062178 A1, entitled "VOIP GROUP RESOURCE MANAGEMENT", is incorporated herein by reference in its entirety.

US patent publication No. US2008/0025337 A1, entitled "Apparatus and Method for Handling Control Channel Reception/Decoding Failure in a Wireless VoIP Communication System", is incorporated herein by reference in its entirety.

Although the above U.S. patent applications disclose scheduling schemes for VoIP, they adopt BITMAP and packet scheduling schemes, but not the persistent scheduling scheme, and they fail to solve the problem occurs when transmitting variable size VoIP packets yet.

SUMMARY OF THE INVENTION

A method for resource allocation, base station and mobile communication terminal is described. In one embodiment, the method comprises setting a persistent radio resource set and an complementary resource set to be allocated to a terminal; and determining a radio resource to be used according to the size of a packet to be transmitted by the terminal or by a base station.

BRIEF DESCRIPTION OF THE DRAWINGS

The accompanied drawings constitute a part of the present application, are for further understanding of the present invention and do not intend to limit the present invention.

DETAILED DESCRIPTION OF THE DRAWINGS

Figure 1:
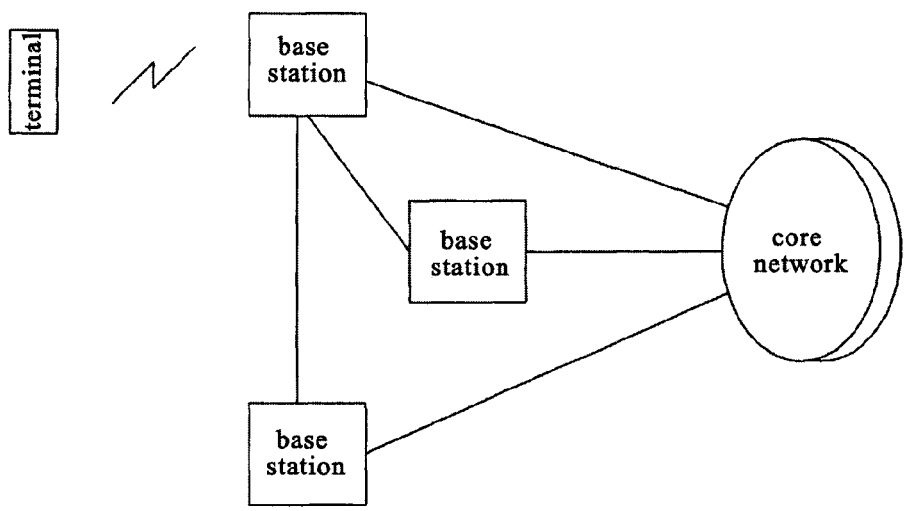
FIG. 1 is a schematic diagram showing an architecture of a wireless communication network according to the prior art.
Figure 2:
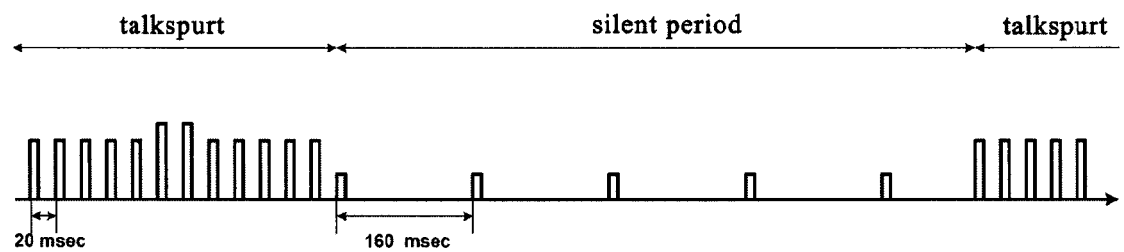
FIG. 2 is a schematic diagram showing a constitution of a VoIP service according to the prior art.
Figure 3:
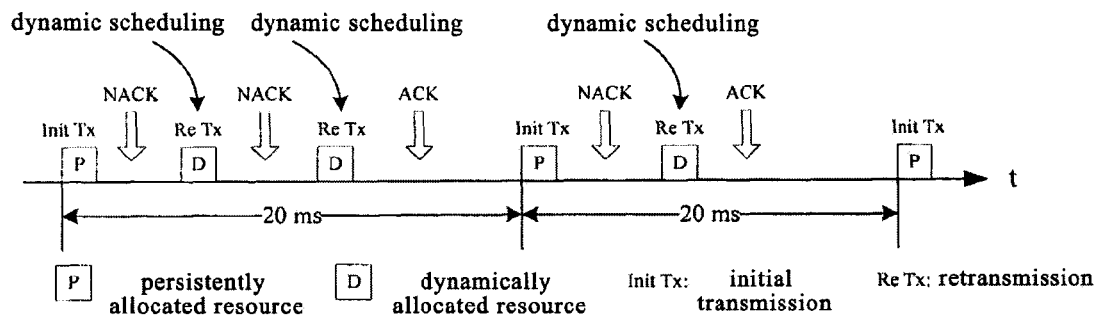
FIG. 3 is a schematic diagram showing a persistent scheduling scheme according to the prior art.
Figure 4:
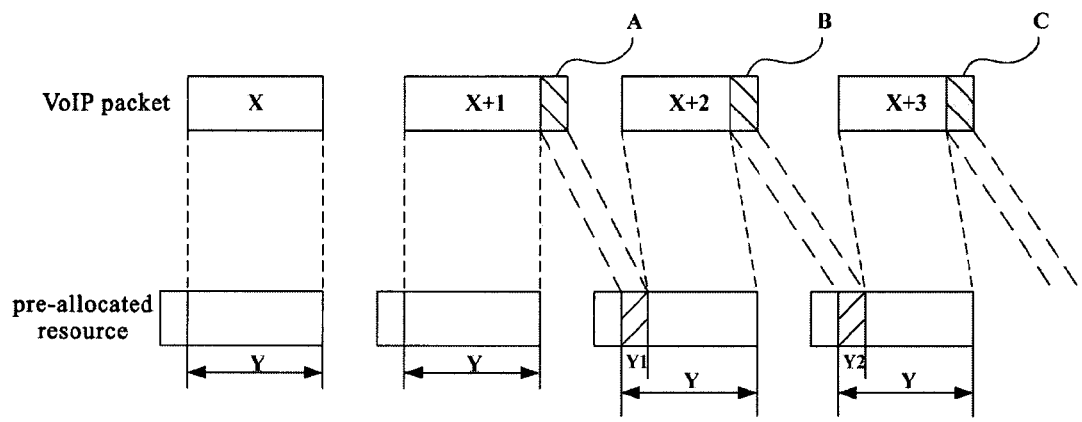
FIG. 4 is a schematic diagram showing dividing a comparatively large VoIP packet into continuous packets.

An embodiment of the present invention includes a method for resource allocation. When a packet is comparatively large and the whole packet cannot be transmitted by using a pre-allocated persistent resource, by the present method, an complementary resource can be allocated to a terminal so that the packet doesn't need to be divided, time delay is reduced, physical layer control information is decreased and the number of accommodated terminal users is increased. The present method is applicable to any service in which packets arrive periodically, such as a VoIP service and real-time service.

Another embodiment of the present invention includes a base station for allocating resources. The base station pre-sets a persistent radio resource and complementary resource for a terminal and when a packet is comparatively large and the whole packet cannot be transmitted by using the pre-allocated persistent resource, the complementary resource is allocated to a terminal so that the packet doesn't need to be divided, time delay is reduced, physical layer control information is decreased and the number of accommodated terminal users is increased.

Still another embodiment of the present invention includes a mobile communication terminal. when a packet at the terminal is comparatively large and the whole packet cannot be transmitted by using a pre-allocated persistent radio resource, the terminal transmits the packet by using the persistent radio resource and an complementary resource allocated by a base station so that the packet doesn't need to be divided, time delay is reduced, physical layer control information is decreased and the number of accommodated terminal users is increased.

In order to achieve the above, the present invention provides a method for resource allocation, which comprises: setting a persistent radio resource set and an complementary resource set pre-allocated to a terminal; determining radio resource to be used according to a size of a packet to be transmitted by the terminal or a base station.

In order to achieve the above embodiments, the present invention provides a base station, which comprises: a first setting unit, for setting a persistent radio resource set allocated to a terminal; a second setting unit, for setting an complementary resource set allocated to the terminal; and a scheduling unit, for determining a radio resource to be used according to a size of a packet to be transmitted.

In order to achieve the above, the present invention provides a mobile communication terminal, which comprises: a detecting unit, for detecting whether there is a control signaling belonging to the terminal; a decoding unit, for decoding a resource indicated by the control signaling if a detecting result is YES; otherwise for decoding a persistent radio resource pre-allocated to the terminal according to a pre-stored resource information if the detecting result is NO.

Advantages of the present invention include that when the whole packet cannot be transmitted by using the pre-allocated persistent resource, the complementary resource is further allocated to the terminal so that the packet doesn't need to be divided, the time delay is reduced, the physical layer control information is decreased and the number of accommodated terminal users is increased. The present invention is applicable to any service in which packets arrive periodically, such as the VoIP service and the real-time service.

The present invention will be further described in detail with reference to embodiments and drawings in order to make the objectives, technical solutions and beneficial effects of the present invention more apparent. The exemplary embodiments and their description are only for illustration but not intended to limit the present invention.

The embodiments of the present invention will be described in detail with reference to the accompanied drawings.

Embodiment One

The present invention provides a method for resource allocation, which comprises: setting a persistent radio resource and a complementary resource set pre-allocated to a terminal; and determining by a base station a radio resource to be used according to the size of a packet to be transmitted.

The above shows that when the base station cannot transmit the whole packet by using the pre-allocated persistent resource, it also allocates the complementary resource to the terminal so that the packet doesn't need to be divided, time delay is reduced, physical layer control information is decreased and the number of accommodated terminal users is increased. This method is applicable to any service in which packets arrive periodically, such as a VoIP service and a real-time service.

Figure 8:
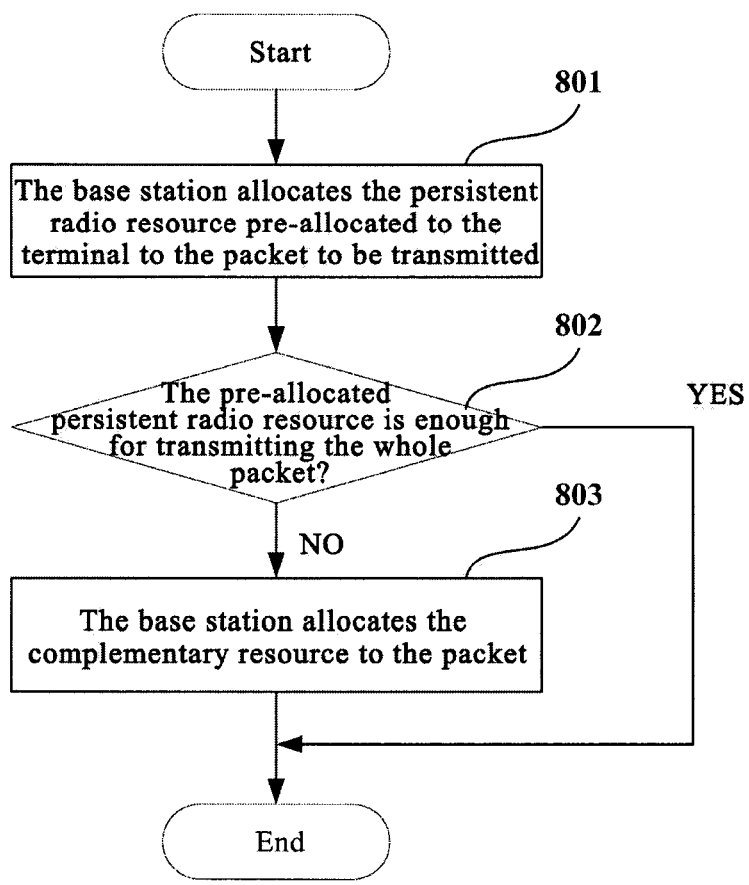
FIG. 8 is a flow chart showing a resource allocation according to the first embodiment of the present invention.

As shown in FIG. 8, when the base station determines radio resources to be used according to the size of a packet to be transmitted, it can use the following steps.

The base station allocates the persistent radio resource pre-allocated to the terminal to the packet to be transmitted (step 801); determines whether the pre-allocated persistent radio resource is sufficient for transmitting the whole packet (step 802); allocates the preset complementary resource to the packet if a judging result is NO (step 803) and finishes the resource allocation if the judging result is YES (step 804).

The above shows that when the base station cannot transmit the whole packet by using the pre-allocated persistent resource, it allocates the complementary resource to the terminal also so that the packet doesn't need to be divided, the time delay is reduced, the physical layer control information is decreased and the number of accommodated terminal users is increased.

In this embodiment, the base station transmits the packet to the corresponding terminal by using the pre-allocated persistent radio resource and the complementary resource.

In this embodiment, when establishing a service connection the method further comprises notifying the pre-allocated persistent radio resource and the complementary resource to the terminal.

In this embodiment, the pre-allocated persistent radio resource is set according to the size of the smallest packet or according to a distribution of the size of the packets. Here, the size of a RoHC compressed packet may vary in a certain range, and thus when the persistent radio resource in pre-allocated, it can be set according to the size of the smallest packet.

In addition, since the variance of packet size corresponds to a certain distribution, the pre-allocated persistent radio resource can be set according to the distribution of the size of the packets, i.e. the pre-allocated persistent radio resource can be set according to any value within the range of the sizes of packets. Therefore, the setting of the pre-allocated persistent radio resource according to the distribution of sizes of packets is a compromise of the pre-allocated resource amount and the physical layer signaling.

In addition, when allocating resources for downlink data, the following method can be used to notify the terminal of the complementary resource: notifying the whole set or a subset of the complementary resource to the terminal.

In this case, the base station allocates the complementary resource to the packet by taking the following method: the base station searches for the complementary resource set to be notified to the terminal; the base station determines whether there is available idle complementary resource in the complementary resource set; if yes, the base station allocates the available complementary resource to the packet. Herein, the base station can search for the complementary resource according to a preset resource index sequence. Thus, by adding the complementary resource to the terminal, the packet doesn't need to be divided, time delay is reduced, physical layer control information is decreased and the number of accommodated terminal users is increased.

In addition, in another embodiment of the present invention, after the complementary resource set is set, the complementary resource in the complementary resource set which is preferably used by the terminal is set, and the complementary resource in the complementary resource set which is preferably used by the terminal is notified to the terminal.

In this case, the base station allocates the complementary resource to the packet by taking the following method: the base station first determines whether the complementary resource which is preferably used by the terminal is available, i.e. determines whether the complementary resource which is preferably used by the terminal has been allocated to other terminals or services; and when the result of the determination is available, the base station allocates the complementary resource, which is preferably used, to the packet. Thus, the base station may allocate the complementary resource according to a preset highest priority. Thus, searching times when the base station is allocating the complementary resource are further reduced, complexity of the base station is reduced, times of blind decoding by the terminal are reduced and complexity of the terminal is reduced.

When the complementary resource which is preferably used by the terminal is not available, the base station searches for the complementary resource other than the complementary resource which is preferably used by the terminal in the complementary resource set notified to the terminal, determines whether there is available idle complementary resource in the complementary resource other than the complementary resource which is preferably used by the terminal, and if yes, the base station allocates the available complementary resource other than the complementary resource, which is preferably used by the terminal, to the packet.

Herein, the base station may search for the complementary resource other than the complementary resource, which is preferably used by the terminal, according to a preset resource index sequence.

In the above embodiment, if the base station determines that there is no available idle complementary resource, the base station may allocate the radio resource to the packet with a dynamic allocation scheme.

In the above embodiment, the amount of complementary resource in the complementary resource set is determined by AMR and/or MCS and/or the number of terminals, i.e. the amount of complementary resource in the complementary resource set is set according to one of the AMR, MCS or the number of terminals or the combination thereof.

Alternatively, the amount of complementary resource in the complementary resource set is set according to a requirement of reducing control signaling. For example, when the system needs less control signaling, it can increase the amount of complementary resource appropriately; if the system allows using more control signaling, it can reduce the amount of complementary resource appropriately.

In the present embodiment, the subset or universal set of the complementary resource may be empty. When the subset or universal set of the complementary resource is empty, the complementary resource may not be allocated to some terminals according to the practical requirement. The advantages of the above scheme are that there is no negative influence when the present invention is used together with the allocation techniques of prior art and the terminals both using and not using the complementary resource can use the same network at the same time.

For different terminals, the respective subsets of the complementary resource notified to the terminals can be the same, different or overlapped and can be notified to the terminals according to the practical requirement.

For example, for terminals UE1, UE2, UE3 and UE4, the preset complementary resource set may be shown as S=(R1, R2, R3, R4, R5).

Herein, the universal set (R1, R2, R3, R4, R5) of the complementary resource may be set for each terminal, i.e. the complementary resource for each terminal is the same. When the complementary resource is allocated to each terminal, the allocation is performed according to the index sequence of the complementary resource, i.e. according to the sequence of R1, R2, R3, R4, R5. However, the allocation scheme is not thus limited but that the complementary resource may be allocated according to any preset scheme.

In addition, the subsets of the complementary resource set can be allocated to different terminals according to the practical requirement. For example, subset S1=(R1,R2,R3) can be set for terminal UE1, subset S2=(R1, R2, R3) can be set for terminal UE2, subset S3=(R3, R4, R5) can be set for terminal UE3 and subset S4=(R2, R3, R4) can be set for terminal UE4. Herein, S1 is the same with S2, S1 and S2 are different from S3 but overlapped with S3 with a same resource R3. Similarly, S1 and S2 are different from S4 but overlapped with S4 with the same resource R2 and R3. In this way, the subset of the complementary resource set may be set according to the capability of the terminal. The larger subset is set for the terminal with a higher capability and the smaller subset is set for the terminal with a lower capability. There is no necessary relation between different subsets and therefore the subsets notified to different terminals may be different.

In the present embodiment, not all of the terminals need to perform blind decoding, and that it will be determined according to the capability of the terminal. For example, in the LTE (long term evolution) network, terminals may be classified into several levels according to their registration capabilities. In the LTE downlink, the blind decoding is supported, but terminals at different levels have different blind decoding capabilities. Some terminals may not perform the blink decoding because of their capability limitations. Therefore the method for resource allocation of the present invention may be applicable to different terminals, i.e. those both can perform the blind decoding and those cannot, and it may be applicable to a scenario in which different terminals co-exist.

When the terminal supports the blind decoding, the base station may decide whether the blind decoding is needed and notifies the terminal, i.e. the base station may decide whether a terminal in the network needs to perform the blind decoding. The objective of doing so is that in some cases (for example when the number of the terminals is relatively small or when the system can support relatively more control signaling), the terminals don't need to perform the blind decoding and the base station will notify the terminals about this so that the complexity in decoding by the terminals may be reduced.

In the present embodiment, if the terminal needs to perform the blind decoding, the procedures include: the terminal detects whether there is its own control signaling, wherein the control signaling may include a terminal ID and resource information, if yes, decodes based on the resource indicated in the resource information in the control signaling and if no, performs decoding on the persistent radio resource pre-allocated to the terminal; determines whether the decoding is successful, if no, the terminal decodes the persistent radio resource and the complementary resource pre-allocated to the terminal. Herein, the decoding of the complementary resource begins from the complementary resource preferably used by the terminal and the decoding is performed according to the resource index sequence. This sequence is only a preferred scheme of the present invention and the present invention is not thus limited but can adopt other sequences to perform decoding.

In the above embodiment, the largest blind decoding times needed for different terminals may be the same or different. The largest blind decoding times may be selected according to the capability of the terminal or may be notified to the terminal by the base station.

In the present embodiment, if the terminal does not need to perform the blind decoding, the method further includes: the terminal detects whether there is its own control signaling, wherein the control signaling may include a terminal ID and resource information; if yes, decodes based on the resource indicated in the resource information in the control signaling and if no, performs decoding on the persistent radio resource pre-allocated to the terminal.

Figure 9:
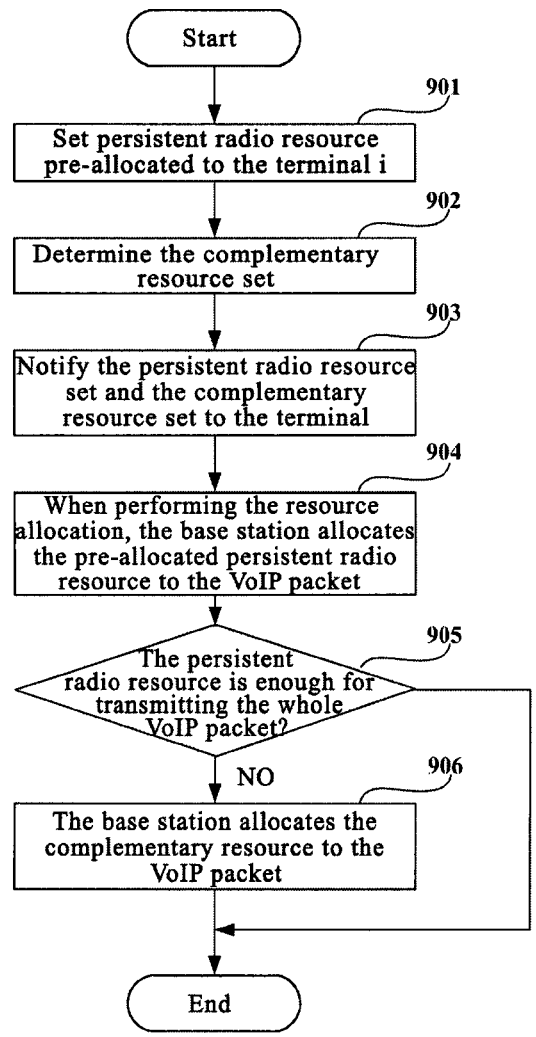
FIG. 9 is a flow chart showing a resource allocation for the VoIP packet according to the first embodiment of the present invention.

The downlink resource allocation method of the present invention will be described in detail with reference to FIG. 9 and FIG. 10 by taking the VoIP service as an example.

Preparation Period

In step 901, the persistent radio resource pre-allocated to the terminal is set, wherein the pre-allocated persistent radio resource is set according to the size of the smallest VoIP packet or according to the distribution of the size of the packet.

In step 902, the complementary resource set is determined, wherein the amount of the complementary resource in the complementary resource set is determined according to any one or more of the group consists of the AMR, MCS and the number of terminals; or the amount of the complementary resource in the complementary resource set is set according to the requirement of reducing the control signaling.

In step 903, the pre-allocated persistent radio resource and the complementary resource set are notified to the terminal when establishing the VoIP service connection, wherein the complementary resource set may be the universal set or a subset of the complementary resource, and the universal set or the subset of the complementary resource may be empty.

Allocating Downlink Resource by Base Station

In step 904, the base station allocates the persistent radio resource pre-allocated to the terminal to the VoIP packet.

In step 905, the base station determines whether the persistent radio resource is enough for transmitting the whole VoIP packet.

In step 906, if the result in step 905 is NO, the base station allocates the available preset complementary resource corresponding to the terminal to the VoIP packet.

If the result in step 905 is YES, the resource allocation finishes.

Figure 10:
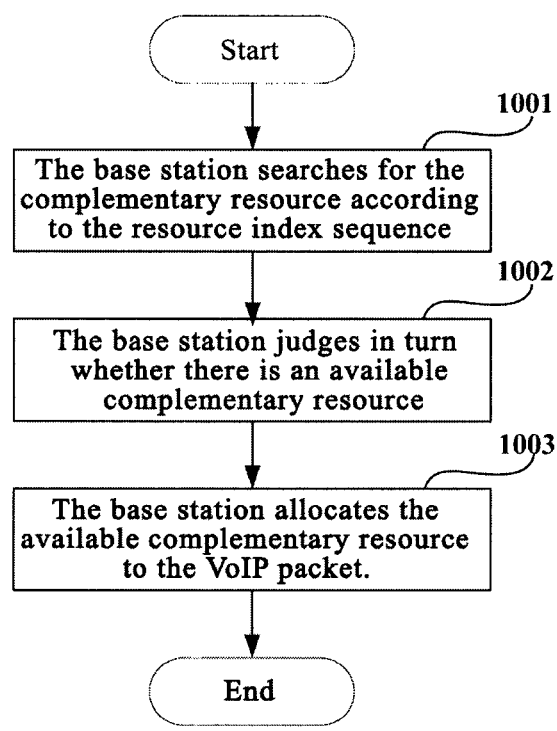
FIG. 10 is a flow chart showing allocating an complementary resource to the terminal in FIG. 9.

In step 906, the base station may allocate the complementary resource to the VoIP packet according to the method shown in FIG. 10.

In step 1001, the base station searches for sets of the complementary resource to be notified to the terminal and the base station may search for the complementary resource according to the preset resource index sequence.

In step 1002, the base station determines in turn whether there is an available complementary resource in the complementary resource set, wherein if the complementary resource set is S=(R1, R2, . . . Ri, . . . Rn), the base station determines in turn whether there is available idle complementary resource in the complementary resource set and the judging may adopt the following method.

Firstly the base station determines whether the complementary resource R1 in the complementary resource set is available; if yes, the base station allocates the complementary resource R1 to the VoIP packet and if the complementary resource R1 has been allocated, the base station subsequently determines whether the complementary resource R2 in the complementary resource set is available, following by analogy, the base station may allocate the available complementary resource to the VoIP packet.

In step 1003, the base station further allocates the available complementary resource to the VoIP packet.

In step 1002, if all the complementary resource R1, R2, . . . Ri, . . . Rn in the complementary resource set has been allocated, the base station adopts the dynamic resource allocation scheme to allocate the resource and the dynamic resource allocation scheme can be realized by techniques of prior art which will not be illustrated in detail here.

Figure 11:
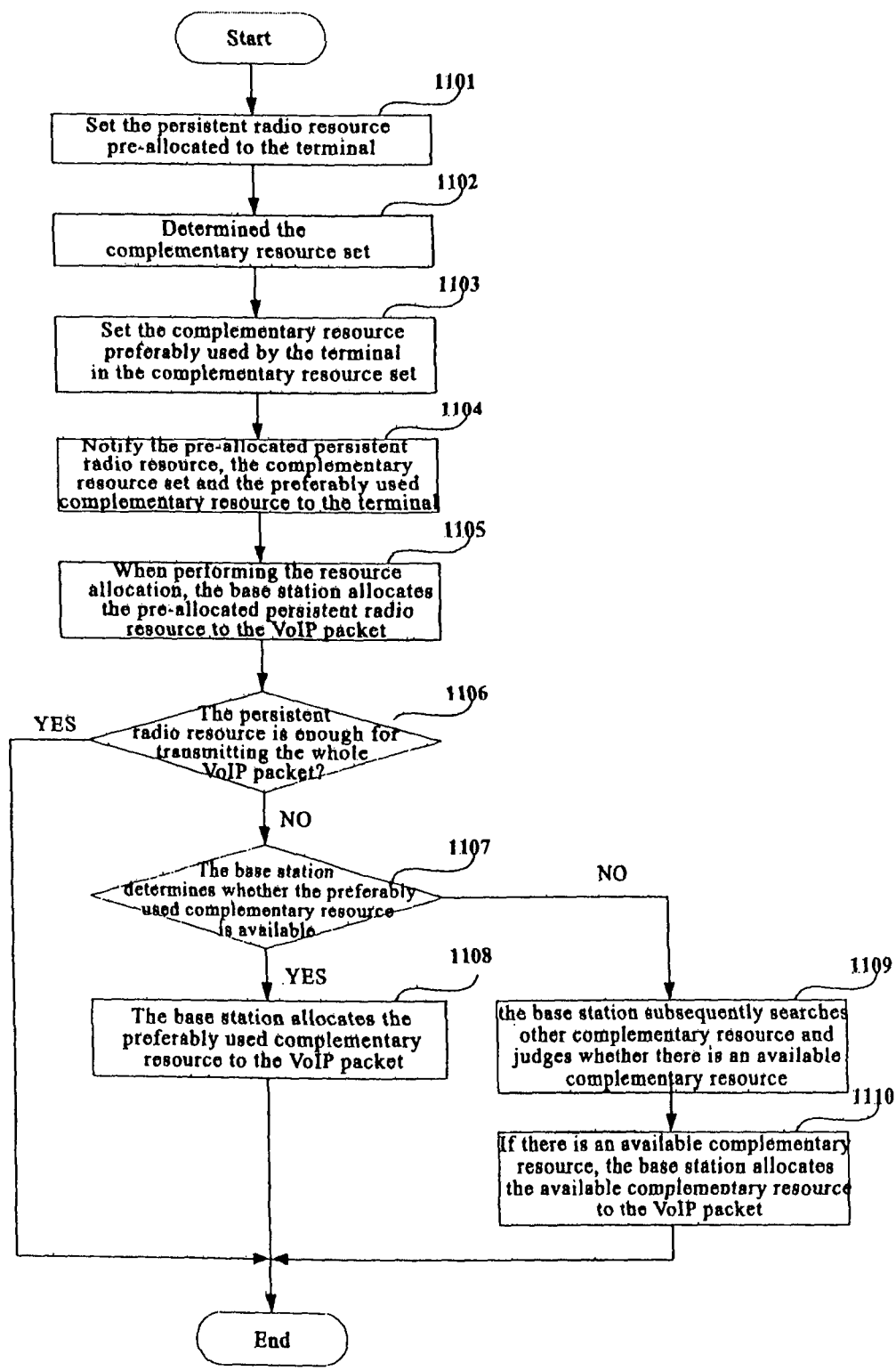
FIG. 11 is a flow chart showing a resource allocation in which the complementary resource is set to be preferably used according to the first embodiment of the present invention.

The present invention will be described in detail with reference to FIG. 11 by taking an example of setting the preferably used complementary resource.

Preparation Period

In step 1101, the persistent radio resource pre-allocated to the terminal is set.

In step 1102, the complementary resource set is determined.

In step 1103, the complementary resource preferably used by the terminal in the complementary resource set is set.

In step 1104, the pre-allocated persistent radio resource, the complementary resource set and the preferably used complementary resource are notified to the terminal when establishing the VoIP service connection, wherein the complementary resource set may be the universal set or a subset of the complementary resource, and the universal set or the subset of the complementary resource may be empty.

Allocating Downlink Resource by Base Station

In step 1105, the base station allocates the persistent radio resource pre-allocated to the terminal to the VoIP packet.

In step 1106, the base station determines whether the persistent radio resource is enough for transmitting the whole VoIP packet.

In step 1107, if the result in step 1106 is NO, the base station determines whether the complementary resource preferably used by the terminal is available;

In step 1108, if the result in step 1107 is YES, the base station allocates the preferably used complementary resource to the VoIP packet.

If the result in step 1106 is YES, the resource allocation finishes.

In step 1109, if the result in step 1107 is NO, i.e. the preferably used complementary resource has been allocated, the base station subsequently determines whether other complementary resource is available, wherein the base station may subsequently determines whether there is an available complementary resource in the complementary resource set according to the resource index sequence.

Herein, if the complementary resource set is S= (R1, R2, . . . Ri, . . . Rn), the preferably used complementary resource corresponding to the terminal is Rj,k. The scheme by which the base station subsequently determines whether there is available complementary resource in the complementary resource set is described above which will not be illustrated in detail here.

In step 1110, the base station allocates the available complementary resource to the VoIP packet.

In step 1109, if all the complementary resource other than the preferably used complementary resource in the complementary resource set has been allocated, the base station adopts the dynamic resource allocation scheme to allocate the resource and the dynamic resource allocation scheme can be realized by techniques of prior art which will not be illustrated in detail here.

When the base station determines the VoIP terminal in the network needs to perform the blind decoding, the base station will notify the VoIP terminal about this. The procedure of the blind decoding of the terminal will be illustrated with reference to FIG. 12.

Figure 12:
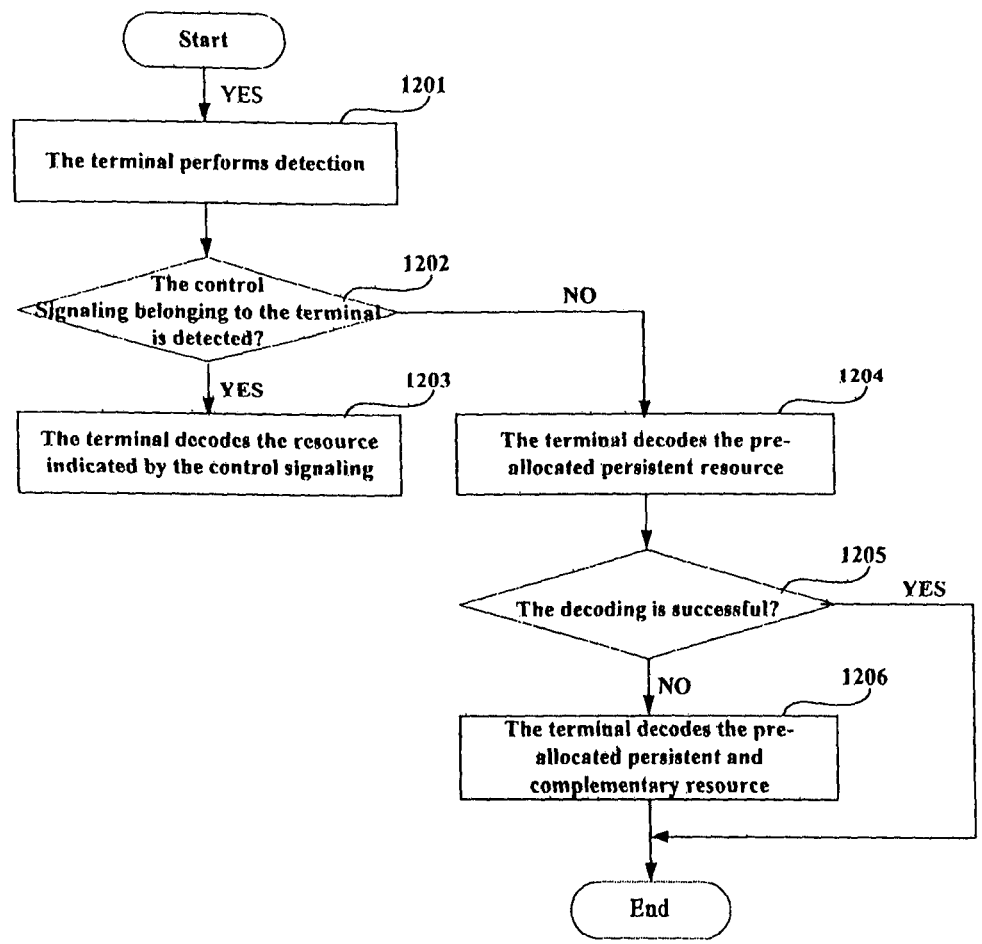
FIG. 12 is a flow chart showing the blind decoding at the terminal according to the first embodiment of the present invention.

As shown in FIG. 12, the blind decoding procedure includes the following steps.

In step 1201, the terminal performs detection.

In step 1202, the terminal determines whether the control signaling belonging to the terminal is detected, wherein in this embodiment the control signaling may be the physical layer control signaling PDCCH.

In step 1203, if the result in step 1202 is YES, the resource indicated by the control signaling is decoded.

In step 1204, if the result in step 1202 is NO, the persistent radio resource pre-allocated to the terminal is decoded.

In step 1205, the terminal determines whether the decoding is successful.

In step 1206, if the result in step 1205 is NO, the base station decodes the persistent radio resource and the complementary resource pre-allocated to the terminal. Herein, the decoding of the complementary resource begins from the complementary resource preferably used by the terminal and the decoding is performed according to the resource index sequence. This sequence is only a preferred scheme of the present invention and the present invention is not thus limited but can adopt other sequences to perform decoding.

If the determination in step 1205 is that the decoding is successful, the procedure finishes.

Beneficial effects of the present invention will be illustrated by taking examples.

Figure 13:
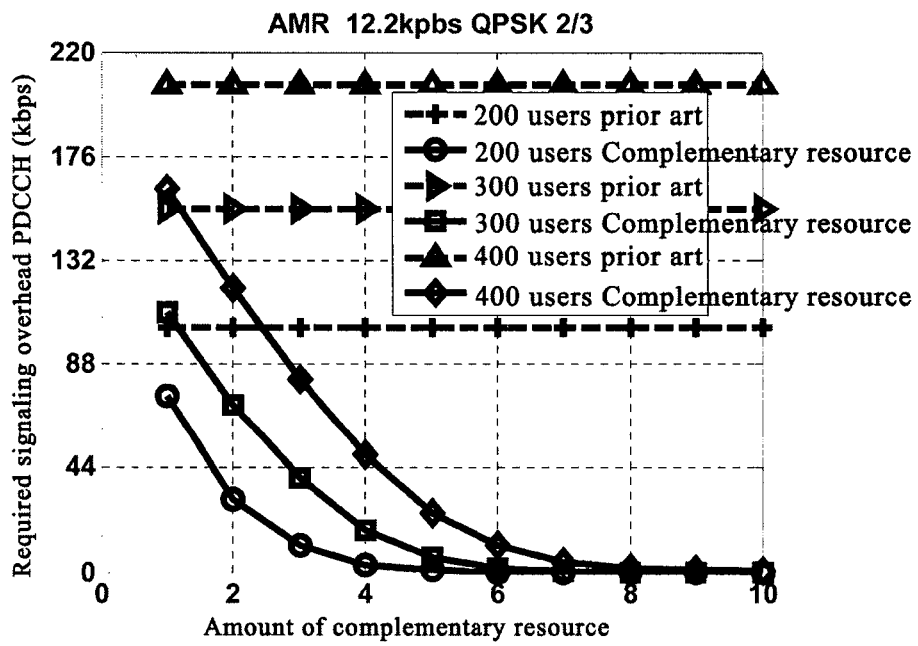
FIG. 13 is a schematic diagram showing a relation between the amount of the complementary resource and signaling overhead needed.

FIG. 13 is a schematic diagram showing a relation between the amount of the complementary resource and needed signaling overhead according to one embodiment of the present invention and the prior art respectively.

For example, in one embodiment of the present invention and the prior art, the AMR is 12.2 kbps, the MCS is QPSK2/3 and the pre-allocated resource is set according to the size of the smallest VoIP packet.

In one embodiment of the present invention, the complementary resource is set according to the number of terminals and the signaling overhead.

When the number of the terminals in the system is 200, the signaling overhead needed in the prior art is 100 kbps while when there are 2 resource blocks the needed signaling overhead is 20 kbps. FIG. 13 shows a large amount of signaling overhead is reduced according to the method for resource allocation of the present invention. When there are 8 resource blocks and 400 VoIP users, the needed signaling is almost zero.

Figure 14:
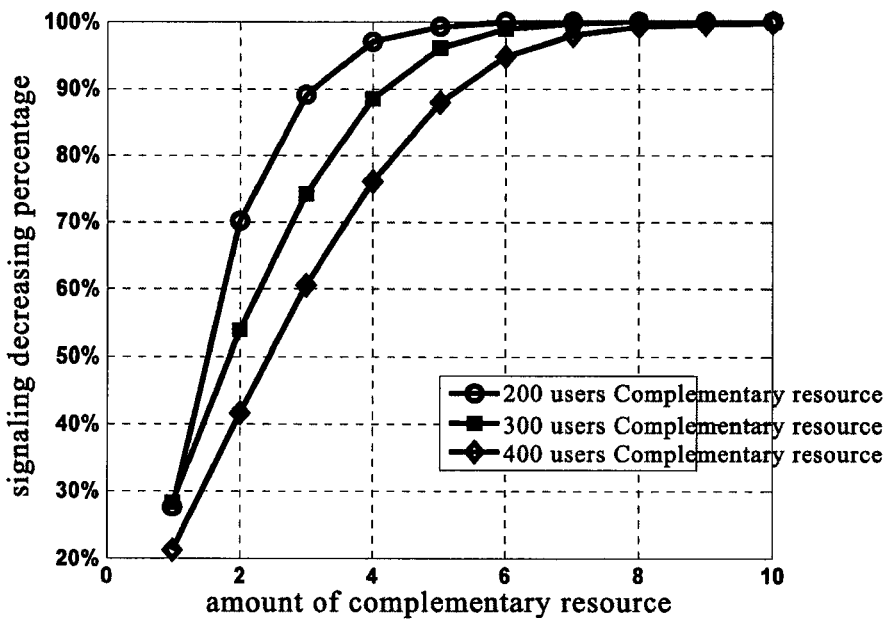
FIG. 14 is a schematic diagram showing a relation between the amount of the complementary resource and the signaling overhead decreasing percentage.

FIG. 14 is a schematic diagram showing a relation between the amount of the complementary resource and the signaling overhead decreasing percentage according to one embodiment of the present invention and the prior art respectively. For example, in the present invention, the AMR is 12.2 kbps, the MCS is QPSK2/3 and the pre-allocated resource is set according to the size of the smallest VoIP packet.

According to one embodiment of the present invention, the complementary resource is set according to the number of terminals and the signaling overhead.

When the number of the terminals in the system is 200 and there are 2 pre-allocated resource blocks, the signaling decreases about 70%. When the number of the terminals in the system is 300 and there are 2 pre-allocated resource blocks, the signaling decreases about 54%. When the number of the terminals in the system is 400 and there are 2 pre-allocated resource blocks, the signaling decreases about 42%.

When the number of the terminals in the system is 200, 300 or 400 and there are 8 pre-allocated resource blocks, the signaling decreases about 100%.

Therefore, FIG. 14 shows that the signaling overhead decreases gradually with the increase of the amount of the complementary resource and the amount of the complementary resource needed can be obtained accordingly based on the requirement of the system to reduce the signaling.

Figure 15A:
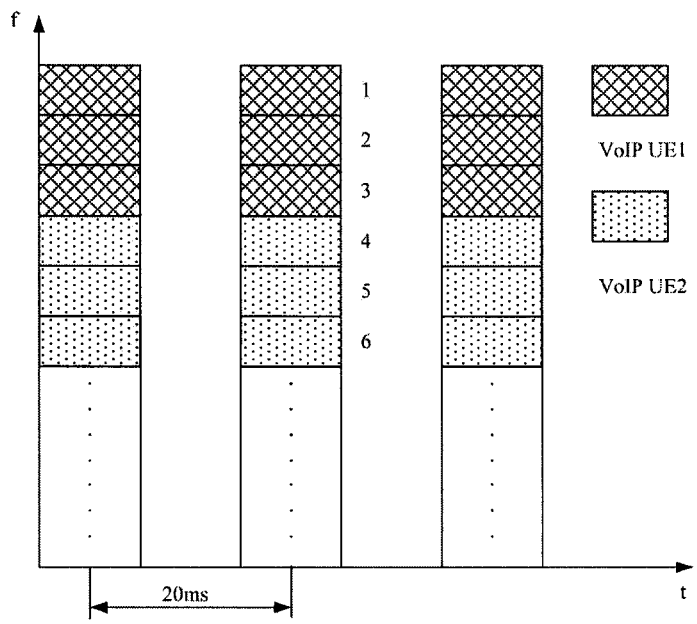
FIG. 15A is a schematic diagram showing setting a pre-allocated resource according to the size of the largest VoIP packet according to the prior art.

Therefore, when the complementary resource is set according to the number of the VoIP terminals and the signaling overhead, if the signaling overhead is small, the amount of the set complementary resource is comparatively large. FIG. 15A is a schematic diagram showing setting a pre-allocated resource according to the size of the largest VoIP packet according to the prior art. According to the prior art, the pre-allocated resource is set according to the size of the largest VoIP packet and when a comparatively small packet is to be transmitted, the dynamic resource allocation scheme is adopted, and the remaining part of the resource pre-allocated to the terminal which is not in use is allocated to other services or users.

As shown in FIG. 15A, when the AMR is 12.2 kbps and the MCS adopts QPSK2/3 and when the pre-allocated resource is set according to the size of the largest VoIP packet, resource blocks 1, 2 and 3 are allocated to VoIP UE1 and resource blocks 4, 5 and 6 are allocated to VoIP UE2. The size of the VoIP packet is relatively small after being RoHC compressed and at this time the pre-allocated resource block 3 may be available and the available resource block 3 may be allocated to another non-VoIP user. Thus, according to this scheme to pre-allocate resource, the number of the accommodated VoIP terminals may be K=50/3*20=320.

Figure 15B:
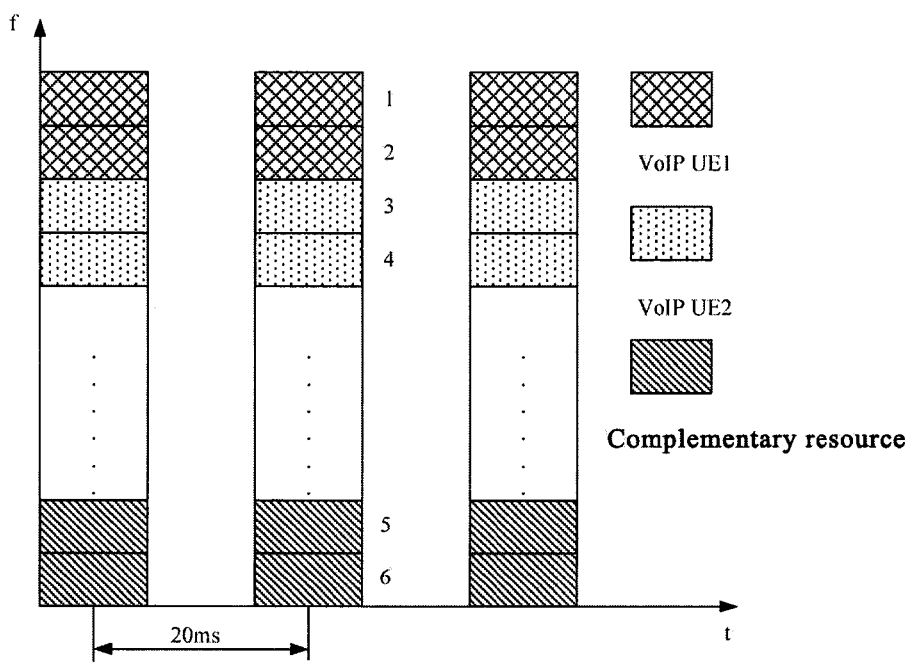
FIG. 15B is a schematic diagram showing setting a pre-allocated resource according to the size of the largest VoIP packet according to an embodiment of the present invention.

As shown in FIG. 15B, when the AMR is 12.2 kbps and the MCS adopts QPSK2/3 and when the pre-allocated resource is set according to the size of the smallest VoIP packet, resource block 1 and 2 are allocated to VoIP UE1, resource blocks 3 and 4 are allocated to VoIP UE2, and the pre-allocated complementary resource blocks are 5 and 6. Thus, according to this scheme to pre-allocate resource, when the amount of the set complementary resource is 2, the number of the accommodated VoIP terminals may be K=(50−2)/2*20=480.

The above description shows that compared with the scheme of setting the pre-allocated resource according to the size of the largest VoIP packet, the resource allocation scheme of the present invention may increase the number of accommodated VoIP terminals.

Figure 16:
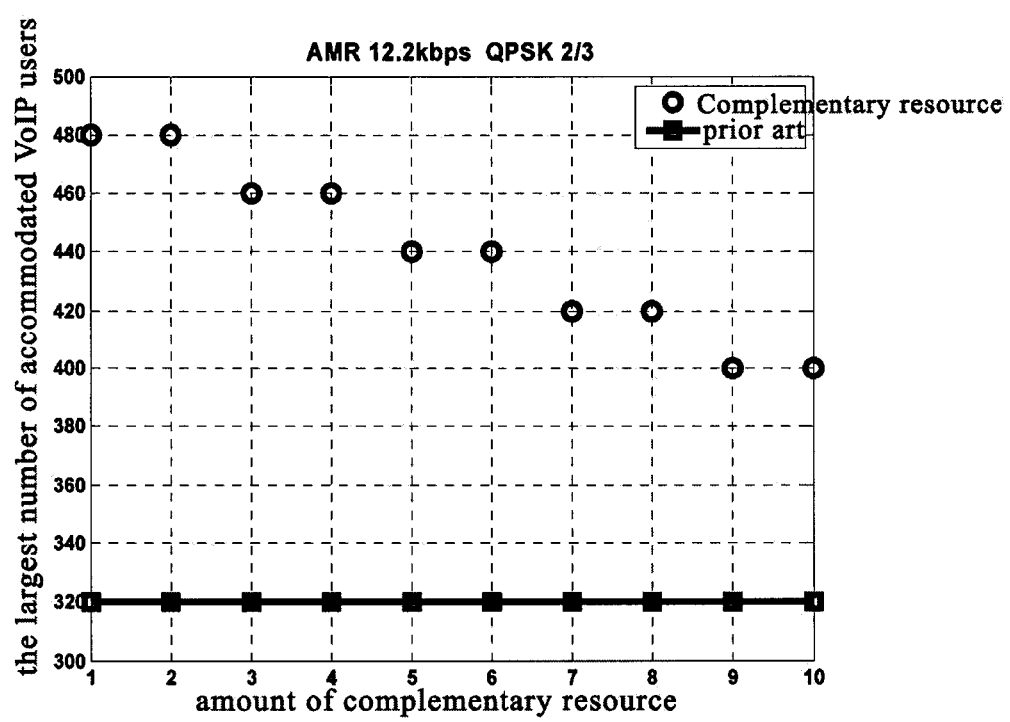
FIG. 16 is a schematic diagram showing a relation between the amount of the complementary resource and the largest number of accommodated terminals.

FIG. 16 is a schematic diagram showing a relation between the amount of the complementary resource and the largest number of accommodated terminals according to an embodiment of the present invention. When the AMR is 12.2 kbps and the MCS adopts QPSK2/3 and when the pre-allocated resource is set according to the size of the smallest VoIP packet, more VoIP terminals may be accommodated according to the method of one embodiment of the present invention. When there are 8 pre-allocated resource blocks, 420 VoIP users may be accommodated according to one embodiment of the present invention, while only 320 VoIP users may be accommodated according to the prior art. Moreover, when there are 8 pre-allocated resource blocks, the signaling overhead needed by the system is almost zero.

The above embodiment shows that when the base station cannot transmit the whole packet by using the pre-allocated persistent resource, it may allocate the complementary resource to the terminal so that the packet doesn't need to be divided, the time delay is reduced, the physical layer control information is decreased and the number of accommodated terminal users is increased. This method is applicable to any service in which packets arrive periodically, such as the VoIP service and the real-time service.

Embodiment Two

The present invention provides a method for resource allocation, which includes: setting the persistent radio resource and the complementary resource set pre-allocated to the terminal; determining the radio resource to be used according to the size of the packet to be transmitted by the terminal.

The above shows that when the terminal cannot transmit the whole packet by using the pre-allocated persistent resource, the base station may further allocate the complementary resource to the terminal so that the packet doesn't need to be divided, the time delay is reduced, the physical layer control information is decreased and the number of accommodated terminal users is increased. This method is applicable to any service in which packets arrive periodically, such as the VoIP service and the real-time service.

In the present embodiment, the method further includes: notifying the terminal about the pre-allocated persistent radio resource and the complementary resource when establishing a service connection. After the terminal receives the pre-allocated persistent radio resource and the complementary resource, it stores the pre-allocated persistent radio resource and the complementary resource.

In the present embodiment, the terminal determines the radio resource to be used according to the size of the packet to be transmitted by the following scheme.

The terminal determines whether the persistent radio resource is enough to transmit the whole packet; if the judging result is NO, the terminal uses the persistent radio resource and the complementary resource to transmit the packet to the base station.

In the present embodiment, the method further includes the terminal reports to the base station that it is in a buffer status. Thus, the base station may recognize there is a large packet to be transmitted according to the reported buffer status. Herein, the terminal may report by using the BSR (buffer status report) but the report scheme is not thus limited.

In the present embodiment, the persistent radio resource is set according to the size of the smallest packet or according to the distribution of the size of the packet and the setting is the same with that described in embodiment one and will not be illustrated in detail here.

In the present embodiment, the following four schemes may be used to set the complementary resource.

Figure 17A:
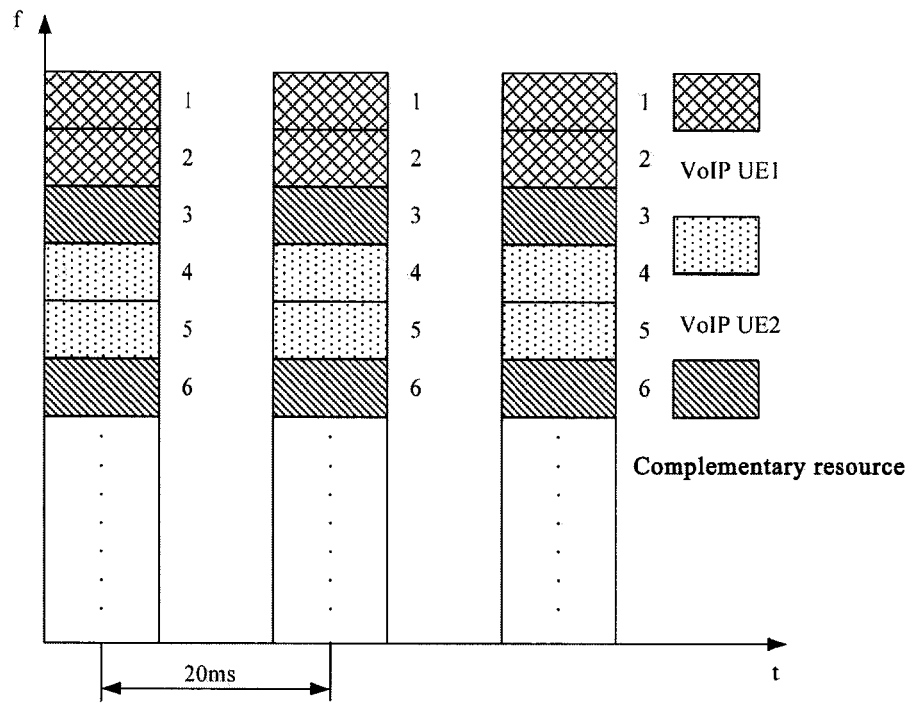
FIGS. 17A to 17D are schematic diagrams showing setting the complementary resource according to the second embodiment of the present invention.

The first scheme: the complementary resource allocated to each terminal is different and the persistent radio resource and the complementary resource allocated to each terminal are continuous. As shown in FIG. 17A, the persistent radio resource blocks allocated to UE1 are 1 and 2 and the complementary resource block is 3; the persistent radio resource blocks allocated to UE2 are 4 and 5 and the complementary resource block is 6.

Figure 17B:
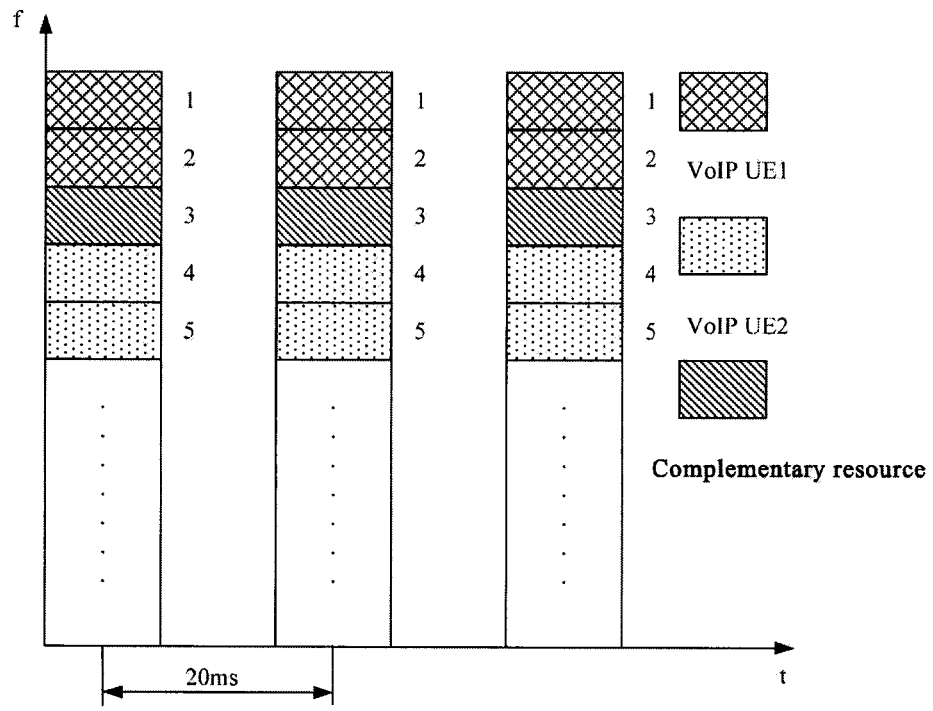

The second scheme: UE1 and UE2 share the same complementary resource. As shown in FIG. 17B, the persistent radio resource blocks allocated to UE1 are 1 and 2 and the persistent radio resource blocks allocated to UE2 are 4 and 5, wherein UE1 and UE2 share the complementary resource block 3.

In this case, when the base station knows that UE1 and UE2 both use the complementary resource block 3, it may allocate the complementary resource block 3 to one of the two UEs and allocate resource to the other UE through the control signaling.

Figure 17C:
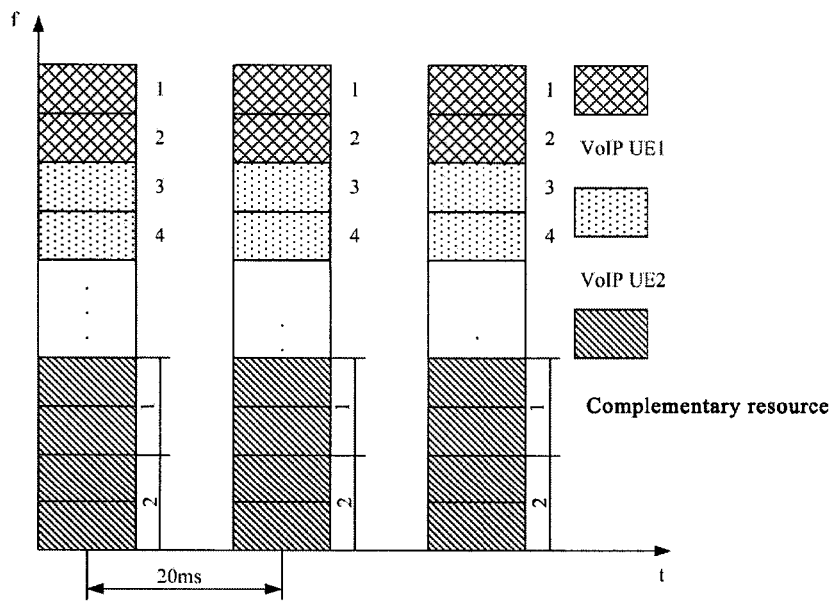

The third scheme: the complementary resource allocated to each terminal is an complementary resource group and the complementary resource groups allocated to different terminals are different. As shown in FIG. 17C, the complementary resource groups are allocated to UE1 and UE2, wherein complementary resource group 1 is allocated to UE1 and complementary resource group 2 is allocated to UE2.

Figure 17D:
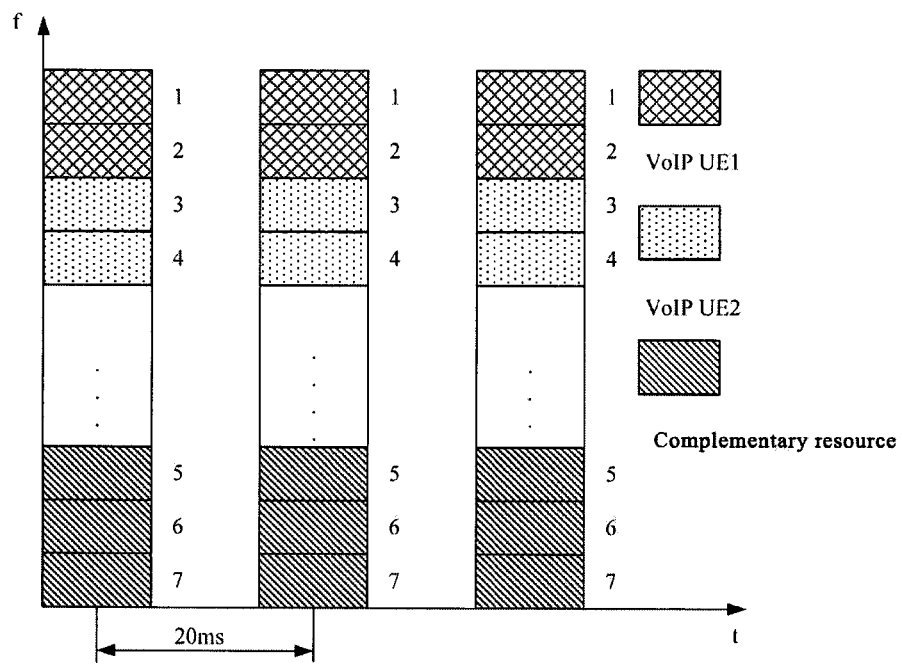

The fourth scheme: the complementary resource allocated to a group of terminals is an complementary resource group and several groups of terminals share the same complementary resource group. As shown in FIG. 17D, UE1 and UE2 compose a group of terminals and the complementary resource allocated to this terminal group is the complementary resource group composed by resource blocks 5, 6 and 7. If UE3 and UE4 compose another group of terminals (not shown in the Figure), the complementary resource group composed by resource blocks 5, 6 and 7 can be also allocated to this terminal group.

The above shows when the packet to be transmitted by the terminal is too large to use the pre-allocated persistent radio resource to transmit, the terminal may transmit the packet by using the persistent radio resource and the complementary resource notified by the base station.

Figure 18:
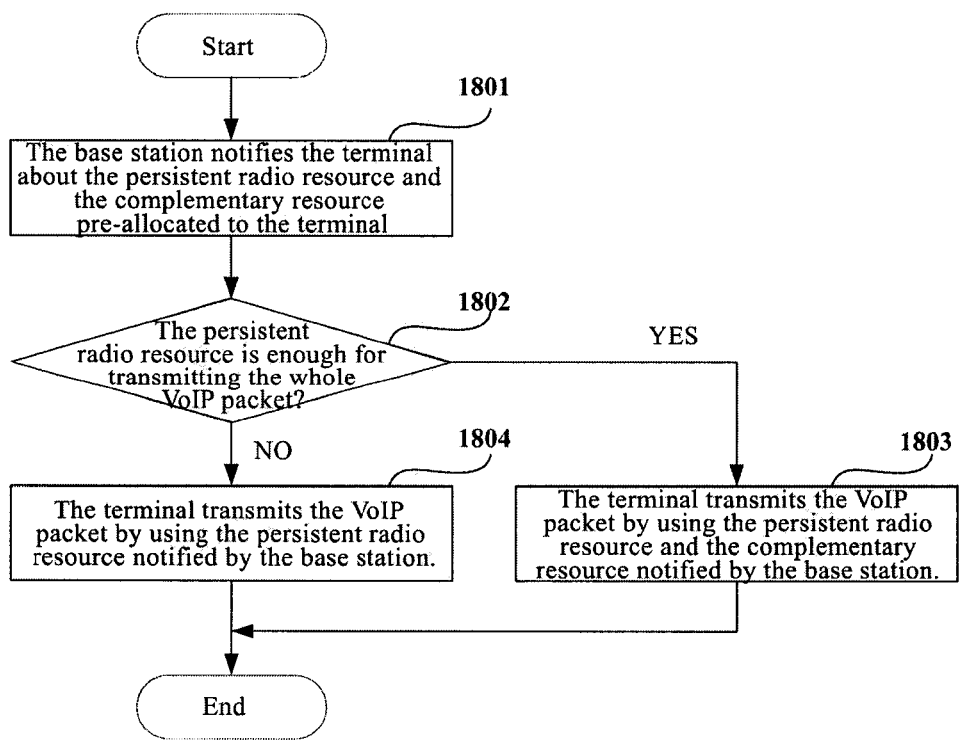
FIG. 18 is a flow chart showing transmitting the VoIP packet according to the second embodiment of the present invention.

The packet transmission of the terminal will be illustrated in detail with reference to FIG. 18 by taking the example of the VoIP service.

In step 1801, when establishing the VoIP service connection, the base station notifies the terminal about the persistent radio resource and the complementary resource pre-allocated to the terminal, wherein the setting of the persistent radio resource and the complementary resource is described above and will not be illustrated in detail here.

In step 1802, the terminal determines whether the preset persistent radio resource is enough for transmitting the VoIP packet.

In step 1803, if the result in step 1802 is YES, the terminal may transmit the VoIP packet by using the persistent radio resource notified by the base station.

In step 1804, if the result in step 1802 is NO, the terminal may transmit the VoIP packet by using the persistent radio resource and the complementary resource notified by the base station.

In addition, when the terminal knows there is a large packet to be transmitted, it will notify the base station. In the present embodiment, the terminal may notify the base station by using the BSR but the report scheme is not thus limited and other signaling may be used to notify the base station.

Thus, the base station may know the size of the VoIP packet to be transmitted by the terminal so the base station does not need to perform the blind detection when receiving the packet.

The above embodiment shows that when the terminal cannot transmit the whole packet by using the pre-allocated persistent resource, it may use the persistent radio resource and the complementary resource notified by the base station to transmit the packet so that the packet doesn't need to be divided, the time delay is reduced, the physical layer control information is decreased and the number of accommodated terminal users is increased. This method is applicable to any service in which packets arrive periodically, such as the VoIP service and the real-time service.

Embodiment Three

Figure 6:
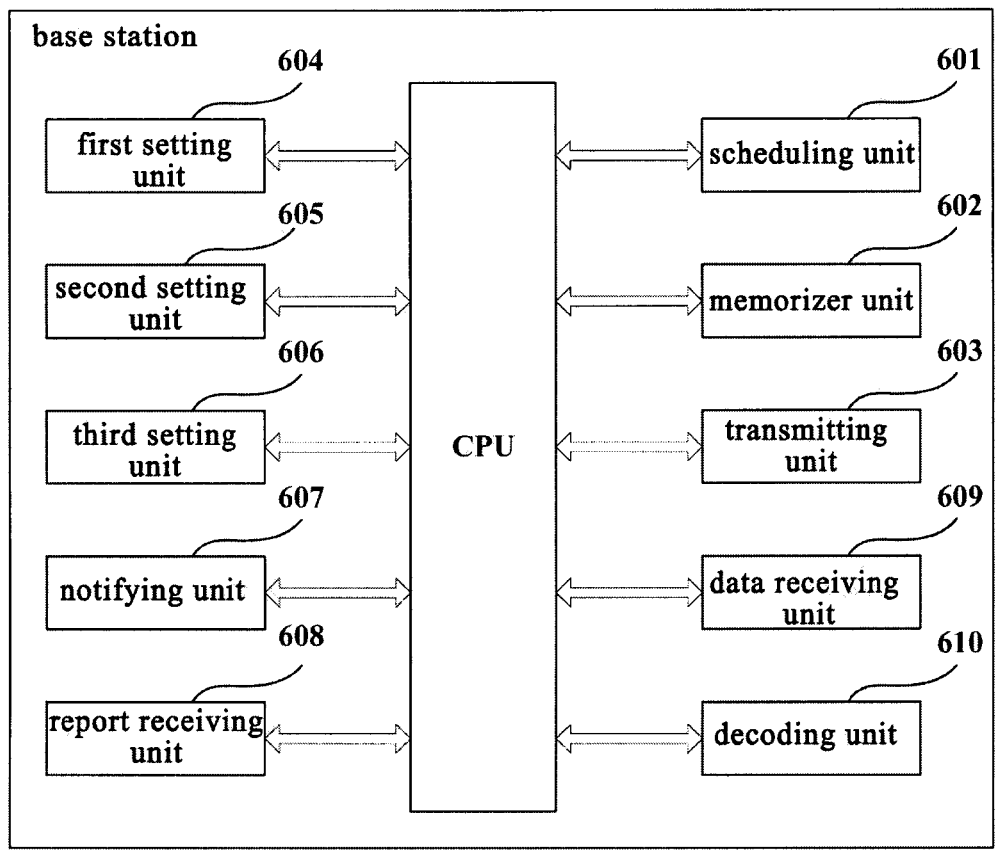
FIG. 6 is a schematic diagram showing of a base station according to the third embodiment of the present invention.

In one embodiment of the present invention provides a base station. As shown in FIG. 6, the base station includes a first setting unit 604, a second setting unit 605 and a scheduling unit 601, wherein the first setting unit 604 is configured for setting the persistent radio resource allocated to the terminal, the second setting unit 605 is configured for setting the complementary resource set allocated to the terminal, and the scheduling unit 601 is configured for determining the radio resource to be used according to the size of the packet to be transmitted.

In the present embodiment, the scheduling unit 601 may adopt the following scheme to determine the radio resource to be used according to the size of the packet to be transmitted: the scheduling unit 601 determines whether the pre-allocated persistent radio resource is enough for transmitting the whole packet and if the result is NO, it allocates the preset complementary resource to the packet. Thus the base station may transmit the whole packet by using the persistent radio resource and the complementary resource.

In the present embodiment, the setting of the persistent radio resource and the complementary resource is the same with that in embodiment one or embodiment two which will not be illustrated in detail here.

The above embodiment shows that when the base station determines that the terminal cannot transmit the whole packet by using the pre-allocated persistent resource, it may allocate the complementary resource to the terminal and the terminal may use the persistent radio resource and the complementary resource to transmit the whole packet so that the packet doesn't need to be divided, the time delay is reduced, the physical layer control information is decreased and the number of accommodated terminal users is increased. This system is applicable to any service in which packets arrive periodically, such as the VoIP service and the real-time service.

As shown in FIG. 6, the base station further includes a notifying unit 607, which is configured for notifying the persistent radio resource and the complementary resource to the corresponding terminal. Herein, when the notifying unit 607 notifies about the complementary resource when establishing the service connecting and transmitting downlink data, it may notify the universal set or subset of the complementary resource set.

As shown in FIG. 6, the base station further includes a third setting unit 606, which is configured for setting the preferably used complementary resource in the complementary resource set. At this point, the notifying unit 607 is further configured for notifying the terminal about the preferably used complementary resource in the complementary resource set.

As shown in FIG. 6, the base station further includes a memorizer unit 602, which is configured for storing the pre-allocated persistent radio resource, the complementary resource set and the preferably used complementary resource in the complementary resource set.

In addition, the base station further includes a transmitting unit 603, which is configured for transmitting the packet according to the resource allocated by the scheduling unit 601. In the terminal shown in FIG. 6, a CPU (central processing unit) controls the operation of each unit in the terminal.

As shown in FIG. 6, the base station further includes a report receiving unit 608, which is for receiving the buffer status report from the terminal.

As shown in FIG. 6, the base station further includes a data receiving unit 609 and a decoding unit 610, wherein the data receiving unit 609 is configured for receiving the uplink packet from the terminal and the decoding unit 610 is configured for decoding the received uplink packet.

The above shows that the base station preset the persistent radio resource and the complementary resource for the terminal so that the base station or the terminal may determine the radio resource to be used according to the size of the packet to be transmitted. When the whole packet cannot be transmitted by using the pre-allocated persistent resource, the complementary resource is allocated to the terminal so that the packet doesn't need to be divided, the time delay is reduced, the physical layer control information is decreased and the number of accommodated terminal users is increased. This system is applicable to any service in which packets arrive periodically, such as the VoIP service and the real-time service.

Embodiment Four

Figure 7A:
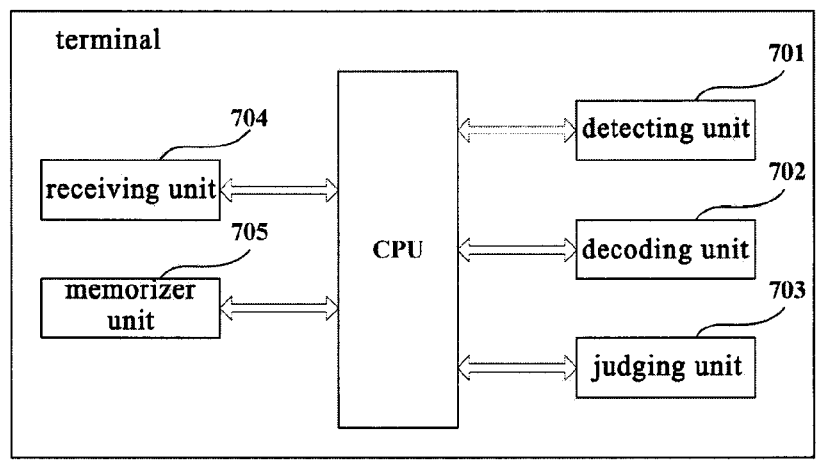
FIG. 7A is a schematic diagram showing of a terminal supporting blind decoding according to the fourth embodiment of the present invention.

An embodiment of the present invention also provides a mobile communication terminal. As shown in FIG. 7A, the terminal supports the blind decoding and the terminal includes a detecting unit 701, a decoding unit 702 and a judging unit 703. The detecting unit 701 is configured for detecting whether there is the control signaling belonging to the terminal wherein the control signaling includes a terminal ID and resource information. If the detection result of the detecting unit 701 is YES, the decoding unit 702 decodes according to the instruction in the control signaling.

If the detection result of the detecting unit 701 is NO, the decoding unit 702 decodes the persistent radio resource pre-allocated to the terminal according to the pre-stored resource information. The judging unit 703 is configured for judging whether the decoding of the decoding unit 702 is successful. If the judging result of the judging unit 703 is NO, the decoding unit 702 further decodes the persistent radio resource and the complementary resource pre-allocated to the terminal.

Figure 7B:
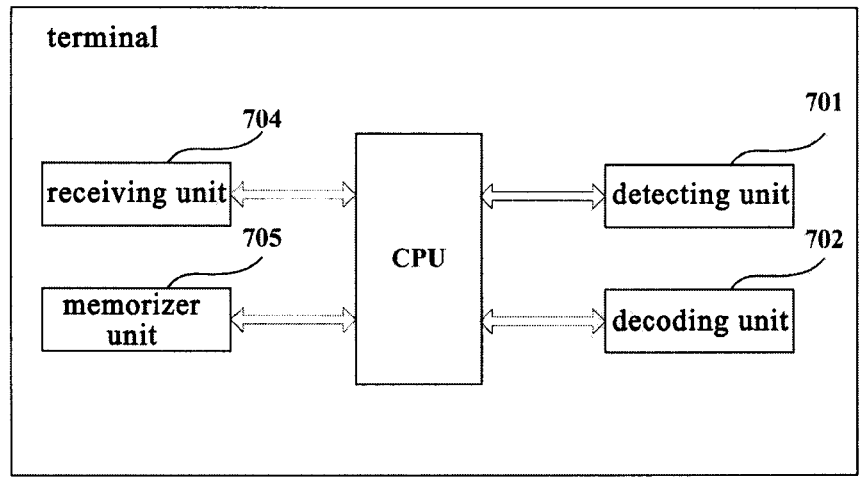
FIG. 7B is a schematic diagram showing of a terminal not supporting blind decoding according to the fourth embodiment of the present invention.

As shown in FIG. 7B, the terminal does not support the blind decoding and the terminal includes a detecting unit 701 and a decoding unit 702'. The detecting unit 701 is configured for detecting whether there is the control signaling belonging to the terminal, wherein the control signaling includes a terminal ID and resource information. If the detection result of the detecting unit 701 is YES, the decoding unit 702' decodes according to the instruction in the control signaling. If the detection result of the detecting unit 701 is NO, the decoding unit 702' decodes the radio resource pre-allocated to the terminal according to the pre-stored resource information.

The decoding of the complementary resource begins from the complementary resource preferably used by the terminal and the decoding is performed according to the resource index sequence.

As shown in FIGS. 7A and 7B, the terminal further includes a receiving unit 704 and a memorizer unit 705.

The receiving unit 704 is configured for receiving the pre-allocated persistent radio resource or the complementary resource set or the complementary resource preferably used by the terminal in the complementary resource set from the base station.

The memorizer unit 705 if configured for storing the resource information notified to the terminal by the base station, the resource information is the pre-allocated persistent radio resource and/or the complementary resource set and/or the preferably used complementary resource in the complementary resource set.

In the terminal shown in FIGS. 7A and 7B, the CPU controls the operation of each unit in the terminal.

The operations of the base station and the terminal are the same with those in embodiment one and will not be illustrated in detail here.

Embodiment Five

Figure 7C:
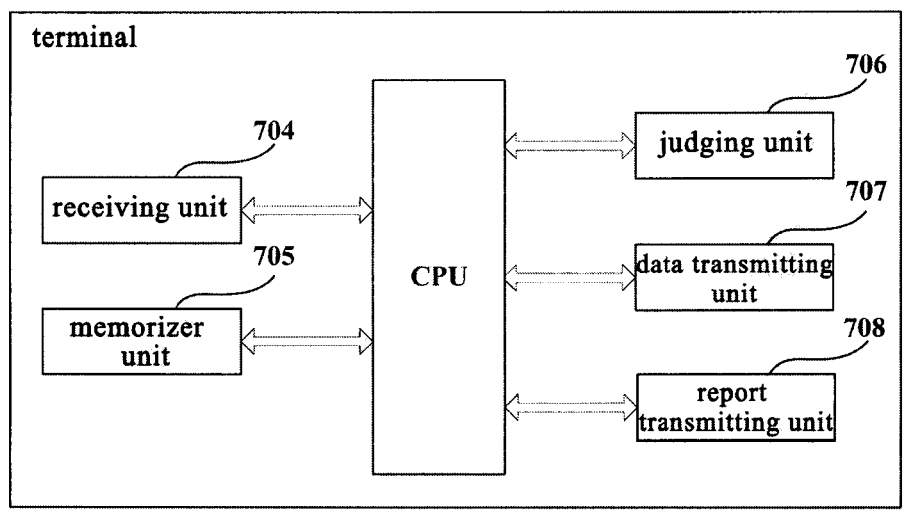
FIG. 7C is a schematic diagram showing of a terminal transmitting uplink data according to the fifth embodiment of the present invention.

The present invention also provides a mobile communication terminal. As shown in FIG. 7C, for establishing the service connection and transmitting uplink packet to the base station, the terminal includes a judging unit 706 and a data transmitting unit 707. The judging unit 706 is configured for judging whether the persistent radio resource preset by the base station for the terminal is enough for transmitting the whole packet. If the judging result of the judging unit 706 is NO, the data transmitting unit 707 transmits the packet to the base station by using the persistent radio resource and the complementary resource.

In addition, the terminal further includes a report transmitting unit 708, which is configured for reporting the status of the terminal to the base station. In the present embodiment, when a large packet is to be transmitted and the preset persistent resource is not enough for transmitting the packet, the BSR may be used to notify the base station but the report scheme is not thus limited and other signaling may be used to notify the base station. Thus the base station does not need to perform the blind detection.

In addition, the terminal further includes a receiving unit 704 and a memorizer unit 705, which functions in the same way as those in embodiment three and four and will not be illustrated in detail here.

The above embodiments four and five are only embodiments of the present invention and embodiments four and five can be combined.

The above shows that the terminal uses the preset persistent radio resource and the complementary resource to transmit the large packet so that the packet doesn't need to be divided, the time delay is reduced, the physical layer control information is decreased and the number of accommodated terminal users is increased. This system is applicable to any service in which packets arrive periodically, such as the VoIP service and the real-time service.

Embodiment Six

Figure 5:
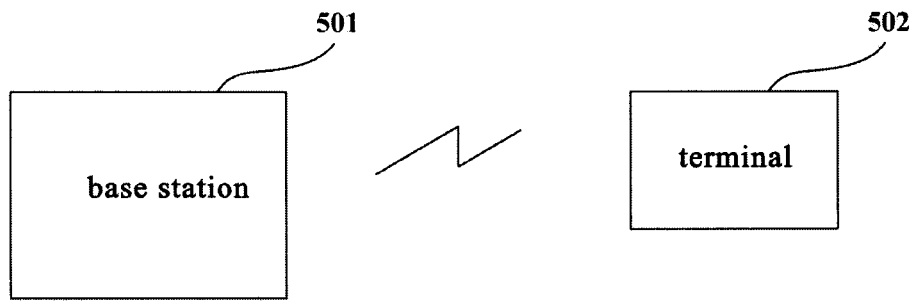
FIG. 5 is a schematic diagram showing of a wireless communication system according to one embodiment of the present invention.

The present invention also provides a wireless communication system. As shown in FIG. 5, the system includes a terminal 502 and a base station 501.

The constitution and functions of the base station 501 are the same with those in embodiment three and will not be illustrated in detail here.

The constitution and functions of the base station 502 are the same with those in embodiment four and five and will not be illustrated in detail here.

The above shows that the terminal and the base station use the preset persistent radio resource and the complementary resource to transmit the large packet so that the packet doesn't need to be divided, the time delay is reduced, the physical layer control information is decreased and the number of accommodated terminal users is increased. This system is applicable to any service in which packets arrive periodically, such as the VoIP service and the real-time service.

The above embodiments further describe the objectives, technical solutions and beneficial effects of the present invention. It should be understood that the above are only embodiments of the present invention and not intended to limit the scope of the present invention. Any modification, equivalent alternate and improvement will fall into the protection scope of the present invention without departing from the spirit and scope of the present invention.

The invention claimed is:

1. A method for resource allocation, comprising:
   setting a persistent radio resource set and an complementary resource set to be allocated to a terminal; and
   determining a radio resource to be used according to the size of a packet to be transmitted by the terminal or by a base station, wherein determining a radio resource to be used according to the size of a packet to be transmitted by a base station comprises:
      allocating a persistent radio resource to the packet to be transmitted by the base station;
      determining whether the persistent radio resource can transmit the whole packet; and
      when the persistent radio resource cannot transmit the whole packet, allocating the persistent radio resource and a complementary resource to the packet, wherein the method further comprises:
   the base station transmitting the packet to the corresponding terminal by using the persistent radio resource and the complementary resource;
   the terminal performing a blind decoding, comprising:
      detecting whether there is a control signaling belonging to the terminal by the terminal,
      decoding the persistent radio resource pre-allocated to the terminal when the result of detecting the control signaling is NO,
      determining whether the decoding is successful, and
      decoding by the terminal the persistent radio resource and the complementary resource pre-allocated to the terminal when the result of determining successful decoding is NO.

2. The method according to claim 1, wherein allocating the complementary resource to the packet includes:
   searching by the base station for the complementary resource set allocated to the terminal;
   determining whether there is an available complementary resource in the complementary resource set; and
   if the result of determining is YES, allocating the complementary resource to the packet by the base station.

3. The method according to claim 1, wherein after setting a persistent radio resource set and a complementary resource set, the method further includes: setting an complementary resource preferably used by the terminal in the complementary resource set.

4. The method according to claim 3, wherein allocating the complementary resource to the packet includes:
   determining whether the preferably used complementary resource corresponding to the terminal is available by the base station; and
   if the determining result of determining is YES, allocating the preferably used complementary resource to the packet by the base station.

5. The method according to claim 4, wherein if the result of determining is NO, the method further comprises:
   searching by the base station for an complementary resource in the complementary resource set allocated to the terminal other than the preferably used complementary resource;
   determining whether there is an available complementary resource in the complementary resource other than the preferably used complementary resource; and
   if the result of determining is YES, the base station allocating the available complementary resource other than the preferably used complementary resource to the packet.

6. The method according to claim 1, wherein when establishing a service connection, the method further includes: notifying the persistent radio resource and the complementary resource set to the terminal by the base station.

7. The method according to claim 3, wherein when establishing a service connection, the method further includes: notifying the persistent radio resource, the complementary resource, and the complementary resource preferably used by the terminal in the complementary resource set to the terminal by the base station.

8. The method according to claim 1, wherein the persistent radio resource is set according to the size of the smallest packet or according to the distribution of the size of the packet.

9. The method according to claim 6, wherein when allocating a resource for downlink data, notifying the complementary resource set to the terminal includes: notifying a universal set or a subset of the complementary resource set to the terminal.

10. The method according to claim 7, wherein when allocating a resource for downlink data, the step of notifying the complementary resource set to the terminal includes: notifying a universal set or a subset of the complementary resource set to the terminal.

11. The method according to claim 9, wherein the respective notified subsets of the complementary resource set are different, overlapped or the same for different terminals.

12. The method according to claim 10, wherein the respective notified subsets of the complementary resource set are different, overlapped or the same for different terminals.

13. The method according to claim 1, wherein an amount of the complementary resource in the complementary resource set is determined according to AMR (adaptive multi-rate), and/or MCS (modulation coding scheme), and/or the number of terminals, or is set according to the requirement of reducing a control signaling.

14. The method according to claim 1, wherein after allocating the complementary resource to the terminal, the method further includes:
   determining whether there is remaining complementary resource; and
   if the result of determining is YES, allocating the remaining complementary resource to a packet of other service.

15. The method according to claim 1, further comprising: detecting whether there is a control signaling belonging to the terminal by the terminal; if the result of detecting is NO, decoding the persistent radio resource pre-allocated to the terminal; and if the result of detecting is YES, decoding a resource indicated by the control signaling.

16. The method according to claim 6, wherein determining a radio resource to be used according to a size of a packet to be transmitted by the terminal includes:
   determining whether the persistent radio resource is enough for transmitting the whole packet by the terminal; and
   if the result of determining is NO, transmitting by the terminal the packet to the base station by using the persistent radio resource and the complementary resource.

17. The method according to claim 6, wherein when setting a radio resource for uplink data, an complementary resource allocated to each terminal is different, and the persistent radio resource and the complementary resource allocated to each terminal are continuous.

18. The method according to claim 6, wherein when setting a radio resource for uplink data, two terminals share the same complementary resource.

19. The method according to claim 6, wherein when setting a radio resource for uplink data, a complementary resource allocated to each terminal is a complementary resource group and complementary resource groups allocated to different terminals are different.

20. The method according to claim 6, wherein when setting a radio resource for uplink data, a complementary resource allocated to a group of terminals is a complementary resource group and groups of terminals share the same complementary resource group.

21. A mobile communication terminal, comprising:
   a memory; and
   a processor coupled with the memory to execute
   a detecting unit, which is configured to detect whether there is a control signaling belonging to the terminal,
   a decoding unit, which is configured to decode a resource indicated by the control signaling if a result of detecting is YES, and otherwise decoding a persistent radio resource pre-allocated to the terminal according to a pre-stored resource information if the detecting result is NO,
   wherein the mobile communication terminal further comprises:
   the processor to execute
   a first judging unit, which is configured to determine whether the decoding of the radio resource pre-allocated to the terminal by the decoding unit is successful, and
   wherein if a result of determining is NO, then the persistent radio resource and a complementary resource pre-allocated to the terminal are decoded by the decoding unit, wherein the mobile communication terminal performs a blind decoding to detect whether there is a control signaling belonging to the terminal by the terminal;

decode the persistent radio resource pre-allocated to the terminal when the result of detection of the control signaling is NO, determine whether the decoding is successful, and decode by the terminal the persistent radio resource and the complementary resource pre-allocated to the terminal when the result of determination of successful decoding is NO.

22. The terminal according to claim 21, wherein further comprising:

the processor to execute a receiving unit, which is configured to receive the pre-allocated persistent radio resource or the complementary resource set or the complementary resource preferably used by the terminal in the complementary resource set from the base station, and a memorizer unit, which is configured to store the resource information notified to the terminal by the base station, wherein the resource information includes the pre-allocated persistent radio resource and/or the complementary resource set and/or the preferably used complementary resource in the complementary resource set.

23. The terminal according to claim 22, wherein further comprising:

the processor to execute a second judging unit, which is configured to determine whether the persistent radio resource preset by the base station for the terminal is enough for transmitting a whole packet, and a data transmitting unit, which is configured to transmit the packet to the base station by using the persistent radio resource and the complementary resource if the result of determining by the second judging unit is NO.

* * * * *